United States Patent [19]

Obayashi

[11] Patent Number: 5,547,619
[45] Date of Patent: Aug. 20, 1996

[54] TOGGLE TYPE INJECTION MOLDING PROCESS

[75] Inventor: Tadanori Obayashi, Hiroshima, Japan

[73] Assignee: The Japan Steel Works, Ltd., Tokyo, Japan

[21] Appl. No.: 315,623

[22] Filed: Sep. 30, 1994

[51] Int. Cl.$^6$ ............................................. B29C 45/80
[52] U.S. Cl. ................. 264/40.1; 264/2.2; 264/40.5; 264/328.7; 425/150; 425/593
[58] Field of Search .................... 264/40.1, 40.5, 264/2.2, 328.7; 425/149, 150, 590, 593, 451.6

[56] References Cited

U.S. PATENT DOCUMENTS

| | | | |
|---|---|---|---|
| 4,364,878 | 12/1982 | Laliberte et al. | 264/2.2 |
| 4,900,242 | 2/1990 | Maus et al. | 264/328.7 |
| 4,907,960 | 3/1990 | Hertzer | 264/2.2 |
| 5,002,706 | 3/1991 | Yamashita | 264/2.2 |
| 5,149,471 | 9/1992 | Catanzaro et al. | 264/40.5 |
| 5,190,714 | 3/1993 | Reinhart | 425/593 |
| 5,399,303 | 3/1995 | Yamaguchi et al. | 264/2.2 |
| 5,417,899 | 5/1995 | Kitamura | 425/150 |

Primary Examiner—Jill L. Heitbrink
Attorney, Agent, or Firm—Sughrue, Mion, Zinn, Macpeak & Seas

[57] ABSTRACT

An injection compression molding method in which molten resin of a predetermined amount is injected into a mold cavity during or after a mold closing process. The molten resin is compressed by advancing a crosshead in a first direction to a predetermined stroke position to form a molded piece. Strain of the molded piece is relieved by moving the crosshead in a second direction, which is opposite the first direction, to a predetermined retracted position. The compressing step includes setting and storing a moving distance for each of stroke zones through which a movable portion of a mold clamping cylinder moves and a period required for the movable portion to move through the stroke zone, measuring a moving period of the movable portion for each of the stroke zones in a molding cycle, comparing the moving period of the movable portion with the corresponding preset period to obtain a difference between the periods for each stroke zone, and adjusting the flow rate of fluid supplied to the mold clamping cylinder to set the difference in period for each stroke zone to zero in the next molding cycle.

2 Claims, 6 Drawing Sheets

TOGGLE TYPE INJECTION MOLDING PROCESS

BACKGROUND OF THE INVENTION

1. Field of the Invention

The invention relates to an injection compression molding method, and also to a toggle type mold clamping apparatus, further relates to a method of controlling a flow rate of a mold clamping cylinder of a toggle type injection molding machine and still further relates to a toggle type mold clamping apparatus, and particularly to a toggle type mold clamping apparatus having an overload protecting function.

2. Related Art

An example of a prior art injection compression molding apparatus is shown in Unexamined Japanese Patent Publication No. SHO 61-253520. The injection compression molding apparatus is of the so-called direct acting type. In the apparatus, a movable platen is directly attached to a piston rod of a mold clamping cylinder so that the movable platen is moveable the same speed (by the same moving distance) as that of the piston rod. In one of known injection compression molding methods, molten resin is injected into a cavity at a given mold closing stroke position at which the molds are not completely closed and the compression process is started at the middle of the mold closing process. That is, a relatively long compression stroke is set so that molten resin is sufficiently compressed. This method is frequently employed in a foam molding or the like.

However, such a direct acting type injection compression molding apparatus of the prior art has a problem in that it is cumbersome to control the position of the movable platen. In an injection compression molding apparatus, there may be a case where, in a compression step wherein molten resin supplied into the mold cavity is subjected to a process of reducing the capacity of the cavity, a compression force must be exerted in a stepwise manner by advancing the movable platen in stages, or a case where a step of slightly increasing the cavity capacity (a strain relieving step) must be conducted in the course of the molding process in order to relieve strain of a molded piece due to the compression molding. In order to conduct such a positional control on the movable platen, therefore, a high-precision sensor for accurately detecting the position of the movable platen, and a high-precision flow rate control device for stopping the movable platen at a given position are required. This makes the positional control of the movable platen cumbersome.

Such a direct acting type injection compression molding apparatus of the prior art has another problem in that it is cumbersome to control the speed of the movable platen. When a molding process is conducted using a long compression stroke as described above. Particularly, the speed of the movable platen must be controlled over the long stroke. In an injection compression molding, a compression force is applied to molten resin supplied into the mold cavity by reducing the cavity capacity (or advancing the movable platen), and therefore the control of the speed of the movable platen must be started from the beginning of the compression process. In the case of a direct acting type mold clamping apparatus, furthermore, a final compression step is conducted under a state where the fixed mold is butted against the movable mold (the mold-contacting state). In order to prevent the molds from being damaged by shock due to the butting, the deceleration of the movable platen must be started from a position which is in front of the butting position, thereby making the control of the speed of the movable platen cumbersome.

SUMMARY OF THE INVENTION

According to the invention, the position of a toggle mechanism in the side of a crosshead is measured, and the position of a movable platen is controlled by using the stroke reduction function of the toggle mechanism in accordance with the position of the crosshead, thereby solving the problems. Specifically, the injection compression molding method of the invention comprises: a mold closing step of moving a mold in a closing direction by means of a crosshead of a toggle mechanism; an injection step of injecting molten resin of a predetermined amount into a mold cavity during or after a mold closing process; a compression step of pressing the molten resin under a state where the crosshead is positioned at a previously decided stroke position for a predetermined period; a strain relieving step of moving the crosshead to a predetermined retract position which is in the rear of the stroke position, to move the mold by a predetermined distance corresponding to the movement in a mold opening direction, thereby relieving strain of a molded piece; and a molded piece removing step of opening the molds to remove the molded piece. The compression step may be executed at plural stroke positions for a one-stage compression to an n-stage compression. The toggle type mold clamping apparatus of the invention is an apparatus in which a mold clamping is conducted by means of a toggle mechanism by supplying an oil pressure from an oil pressure source to a clamping side oil chamber of a mold clamping cylinder through a main pipe, a flow control valve, a main selector valve, and a first pipe, and by releasing the return oil from an opening side chamber to a tank through a second pipe, and the main selector valve. The clamping apparatus comprises: a first pilot check valve disposed in the first pipe through which the main selector valve communicates with the clamping side oil chamber of the mold clamping cylinder; a first pilot pipe through which the first pipe communicates with a pilot port of the first pilot check valve; a first selector valve disposed in the first pilot pipe; a second pilot check valve disposed in the second pipe through which the main selector valve communicates with the opening side oil chamber of the mold clamping cylinder; a second pilot pipe through which the second pipe communicates with a pilot port of the second pilot check valve; a second selector valve disposed in the second pilot pipe; a branch pipe connected to the first pilot pipe at a position which is in the side of the main selector valve with respect to the first pilot check valve; a variable throttle valve and a third selector valve which are disposed in the branch pipe in this sequence as viewed toward the downstream side; a position sensor which can detect the position of the toggle mechanism in the side of a crosshead; and a controller. The controller stores a predetermined strain relieving position for the crosshead and receives a signal indicative of a measured position from the position sensor. After the crosshead of the toggle mechanism reaches a predetermined forward limit position, the controller outputs a command signal instructing the third selector valve to be switched to a position at which the first branch pipe communicates with the tank, and starts the comparison between the measured position and the preset position. When the two positions coincide with each other, the controller outputs a command signal instructing the first selector valve to be switched to a pilot port communication position.

According to the invention, a flow rate supplied to a mold clamping cylinder is set for each of previously decided stroke zones, on the basis of the stroke zone, a period required for a movable portion of a mold clamping apparatus to move through the zone, and dimensions of a toggle mechanism, whereby the above-discussed problems are solved. In the present method of controlling a flow rate of a mold clamping cylinder of a toggle type injection molding machine, specifically, a flow rate supplied to a mold clamping cylinder for each of previously decided moving zones of a movable portion in the side of a movable platen of a toggle type mold clamping apparatus is automatically set on the basis of the distance of the moving zone, a preset moving period for the moving zone, and dimensions of a toggle mechanism. Preferably, a moving distance for each of the stroke zones of a previously decided movable portion in the side of the mold clamping cylinder, such as a crosshead, and a period required for the movable portion to move through the stroke zone may previously be set and stored. The moving period of the movable portion is measured for each of the stroke zones in a molding cycle, and the measured period is compared with the respective reset period to obtain a difference between the periods for each stroke zone. In the next molding cycle, a flow rate supplied to the mold clamping cylinder is adjusted so that the difference in period for each of the stroke zones becomes zero. The adjustment of the flow rate may be conducted at every given number of molding cycles.

According to the invention, an extension of a tie bar of a mold clamping apparatus is measured, and the tie bar is prevented from being extended by a distance which is greater than a preset extension, whereby the problems are solved.

The toggle type mold clamping apparatus of the invention is an apparatus in which a mold clamping is conducted while a tensile force is exerted on tie bars by means of a toggle mechanism connected to a piston rod of a mold clamping cylinder by supplying an oil pressure from an oil pressure source to a clamping side oil chamber of the mold clamping cylinder through a main pipe, a flow control valve, a main selector valve, and a first pipe in this sequence. The apparatus comprises: a pilot check valve which is disposed in the first pipe and has a pilot port; a pilot pipe which connects the first pipe to the pilot port of the pilot check valve; a pilot selector valve which is disposed in the pilot pipe and can be switched to either of communication and shut-off states between the first pipe and the pilot port of the pilot check valve; a tie bar stretch detection sensor which can detect a stretch distance of the tie bars; and a controller. The pilot check valve is so configured that, when an oil pressure is not supplied from the first pipe to the pilot port, the flow from the main selector valve toward the mold clamping cylinder is allowed, and, when an oil pressure is supplied from the first pipe to the pilot port, the flow from the main selector valve toward the mold clamping cylinder is not allowed. The controller stores a preset stretch distance of the tie bars and receives a signal indicative of a measured stretch distance from the tie bar stretch detection sensor. The controller outputs a command signal so that, when the measured stretch distance is shorter than the preset stretch distance, the pilot selector valve is positioned at the shut-off position, and, when the measured stretch distance becomes equal to the preset stretch distance, the pilot selector valve is positioned at the communication position is output. Preferably, a position detector which can measure the position of the movable portion such as the piston rod of the mold clamping cylinder is used. The controller previously stores a predetermined stroke position of the mold clamping cylinder, and receives a signal indicative of a measured position from the position detector. The controller compares the measured position with the preset position, and, when the positions coincide with each other, outputs a command signal instructing the pilot selector valve to be switched to the communication position for a preset period.

Molten resin is injected into a mold cavity, and a crosshead of a toggle mechanism is advanced to a predetermined position so that a movable platen is positioned at a corresponding position to compress the molten resin in the mold cavity. Under the state where the toggle mechanism is at the full stretch position, the maximum compression force is exerted on the molten resin, thereby conducting a compression molding. When a strain relieving step is required to be done after the compression molding, the crosshead is retracted to a predetermined position so that a movable platen is retracted by a predetermined distance. The moving distance of the movable platen is a small value which is obtained by multiplying the moving distance of the crosshead with a reciprocal of a force magnification (usually, about 50 to 60). Even when a high-precision position sensor, and a high-precision flow rate control device are not used, therefore, the mold can accurately be positioned at a predetermined position by controlling the position of the crosshead with using a position sensor of a usual precision.

A flow rate supplied to a mold clamping cylinder for each of previously decided moving zones is automatically set on the basis of the distance of the moving zone of a movable portion in the side of a movable platen, a preset moving period for the moving zone, and dimension of a toggle mechanism. This allows the movable portion in the side of the movable platen to be controlled so as to move through a predetermined moving zone for a predetermined period in a mold clamping step.

According to the present invention, a moving period during which the movable portion in the side of the movable platen moves through a predetermined stroke zone is measured. The measured period is compared with the preset period and the difference in period is calculated. The flow rate corresponding to the period difference is calculated, and a corrected flow rate is supplied to the mold clamping cylinder in the next cycle. Consequently, the movable portion in the side of the movable platen can finally be moved by means of the toggle mechanism in accordance with the preset period for each of the moving zones.

In a mold clamping step, a tie bar stretch detector measures the stretch distance of the tie bar and outputs to the controller a signal (measured stretch distance) of a level corresponding to the stretch distance. The controller compares the measured stretch distance with a preset stretch distance. When the measured stretch distance is shorter than the preset stretch distance, the controller outputs no signal. When the measured stretch distance becomes equal to the preset stretch distance, the controller outputs a control signal so that the main selector valve is switched to the shut-off position (neutral position), and another control signal so that a pilot switch valve is switched to the position at which the clamping side oil chamber communicates with the pilot port of the pilot check valve. This causes the oil supply from the oil pressure source to the mold clamping cylinder to be stopped, and the oil flow from the clamping side oil chamber of the mold clamping cylinder to the main selector valve through the pilot check valve, to be blocked. Therefore even when the molds and the like are stretched in the mold opening and closing axial direction the toggle type mold clamping apparatus is prevented from being subject to an overload which exceeds a specified load.

DETAILED DESCRIPTION OF THE PREFERRED EMBODIMENTS

Figure 1:
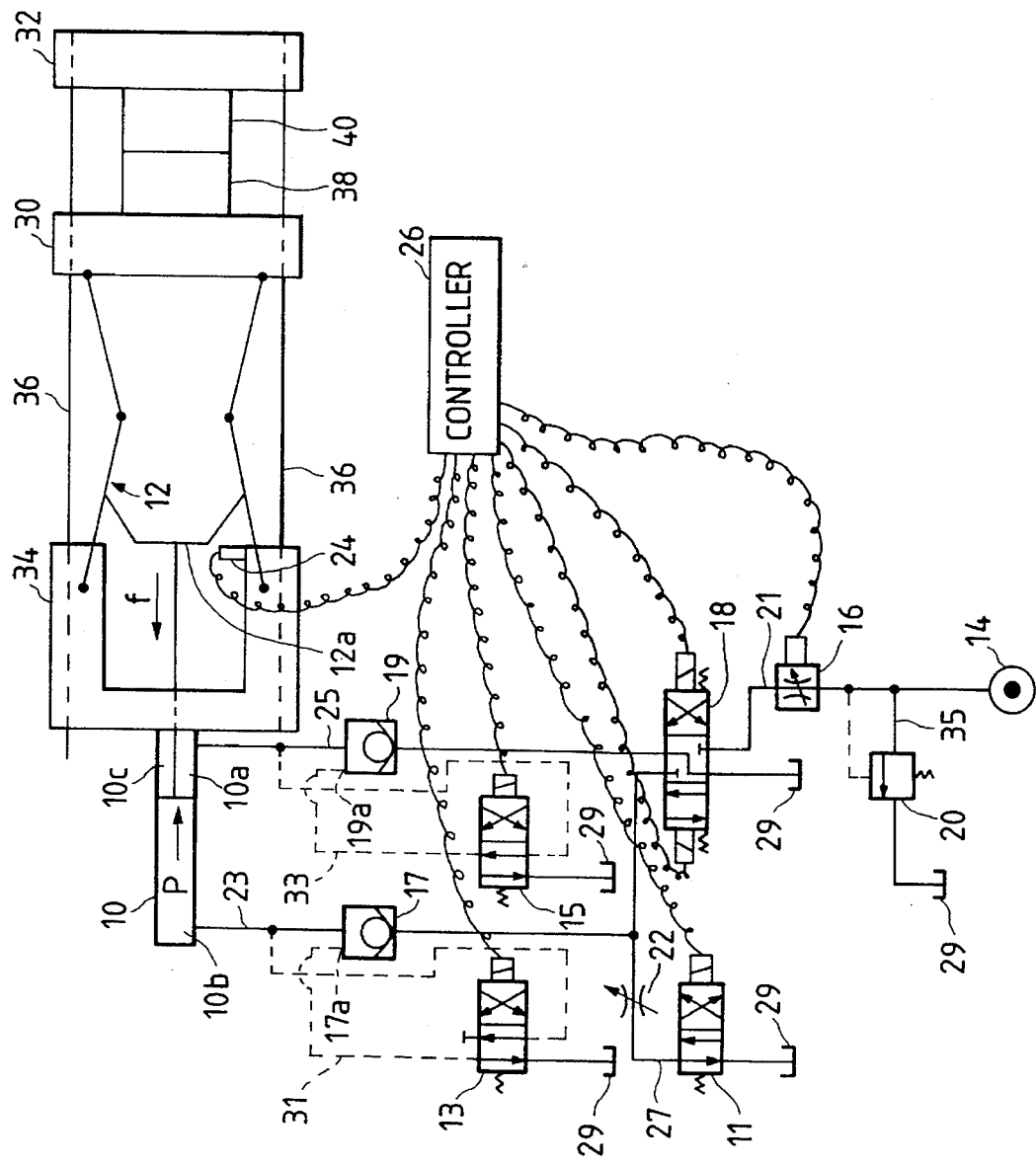
FIG. 1 is a diagram showing an embodiment of the invention.

Preferred embodiment will now be described with the reference numeral to the drawings.

First embodiment

FIG. 1 shows a first embodiment of the invention. A mold clamp housing 34 is placed at a position opposing a stationary platen 32. A movable platen 30 is disposed between the stationary platen 32 and the mold clamp housing 34. The mold clamp housing 34 and the movable platen 30 are connected to each other by a toggle mechanism 12. Specifically, plural links of the toggle mechanism 12 are connected at their one end to the mold clamp housing 34, and at the other end to the movable platen 30. The stationary platen 32 and the mold clamp housing 34 are connected by four tie bars 36 (only two tie bars are shown in the figure) which pass through the movable platen 30. In other words, the axial movement of the movable platen 30 is guided by the tie bars 36. A movable mold 38 is fixed to the movable platen 30, and a fixed mold 40 is fixed to the stationary platen 32. A mold clamping cylinder 10 is attached to the mold clamp housing 34. The piston rod 10a of the mold clamping cylinder 10 passes through a center portion of the mold clamp housing 34, and is connected to a crosshead portion 12a of the toggle mechanism 12.

The mold clamp housing 34 is provided with a position sensor 24 which can detect the position of the crosshead portion 12a. A controller 26 which receives a signal from the position sensor 24 and indicative of a measured position is also provided.

The controller 26 can selectively control the select positions of selector valves 11, 13, 15, and 18 which will be described later. A flow control valve 16, and the main selector valve 18 are connected to a pipe 21 extending from an oil pressure source 14 in this sequence as viewed toward the downstream side. A branch pipe 35 is connected to the pipe 21 at a position which is upstream to the flow control valve 16. A relief valve 20 is connected to the branch pipe 35.

The return side of the relief valve 20 communicates with a tank 29. The relief valve 20 can be used to set the upper limit pressure of the oil pressure source 14. The main selector valve 18 is a three-position selector valve having one port which is connected through a pipe 23 to a clamping side oil chamber 10b of the mold clamping cylinder 10. The pipe 23 is provided with a pilot check valve 17. One end of a pilot pipe 31 is connected to the pilot port of the pilot check valve 17, and the other end of the pilot pipe 31 to the pipe 23. The pilot pipe 31 is provided with the selector valve 13. Specifically, when the selector valve 13 is positioned at the position (solenoid energization position) which is opposite to that shown in the figure, the oil pressure from the pilot pipe 31 is not supplied to the pilot port of the pilot check valve 17 so that the oil is allowed to flow from a higher pressure side to a lower pressure side. In contrast, when the selector valve 13 is positioned at the position (solenoid deenergization position) shown in the figure, the oil pressure from the pilot pipe 31 is supplied to the pilot port of the pilot check valve 17 so that the flow from the mold clamping cylinder 10 is blocked. The other port of the main selector valve 18 is connected to the opening side oil chamber 10c of the mold clamping cylinder 10 through a pipe 25. The pipe 25 is provided with the same valve configuration as that of the pipe 23. That is, the pilot pipe 25 is provided with a pilot check valve 19. One end of a pilot pipe 33 is connected to the pilot port of the pilot check valve 19, and the other end of the pilot pipe 33 to the pipe 25. The pilot pipe 33 is provided with the selector valve 15. When the selector valve 15 is positioned at the position (solenoid energization position) which is opposite to that shown in the figure, the oil pressure from the pilot pipe 33 is not supplied to the pilot port of the pilot check valve 19 so that the oil is allowed to flow from a higher pressure side to a lower pressure side.

In contrast, when the selector valve 15 is positioned at the position (solenoid deenergization position) shown in the figure, the oil pressure from the pilot pipe 33 is supplied to the pilot port of the pilot check valve 19 so that the flow from the mold clamping cylinder 10 is blocked. A branch pipe 27 is connected to the pipe 23 at a position which is upstream to the pilot check valve 17. A variable throttle valve 22, and the selector valve 11 are sequentially disposed in the branch pipe 27 as viewed from the upstream side. The return side of the selector valve 11 communicates with the tank 29. When the selector valve 11 is positioned at the position which is opposite to that shown in the figure, the pressure in the pipe 23 is not reduced. In contrast, when the selector valve 11 is positioned at the position shown in the figure, the pressure in the pipe 23 can be reduced in accordance with the valve travel of the throttle valve 22. According to this configuration, the retraction speed of the crosshead 12a of the toggle mechanism 12 can be controlled.

Next, the operation of the embodiment will be described. In preparation, first, positions (the first-stage compression position, the second-stage compression position, the n-th-stage compression position, and the strain relieving step position) of the crosshead portion 12a corresponding to those of the movable platen 30 are calculated. The calculated positions, and holding periods of the stages are input to the controller 26 as preset data. Also the valve travels of the flow control valve 16 and the throttle valve 22, and the timing of starting the injection process are input to the controller 26. The relief valve 20 is set to a given preset relief pressure. In consequence, preparation to an injection compression molding is completed. The relationship between the position of the crosshead portion 12a of the toggle mechanism 12 and the pressing force generated at each position can be indicated by an expression using the pressure area and the supply pressure of the mold clamping cylinder 10, and the dimensions of the toggle mechanism 12. The moving distance of the movable platen 30 relative to that of the crosshead portion 12a is a small value which corresponds to a reciprocal of a force magnification of the toggle mechanism 12.

In response to instructions from the controller 26, the main selector valve 18 is then switched to the right position in the figure while both the first and second selector valves 13 and 15 are set to the energization position (the position which is opposite to that shown in FIG. 1). Oil which is adjusted in flow rate by the flow control valve 16 is supplied from the oil pressure source 14 to the clamping side oil chamber 10b of the mold clamping cylinder 10, through the main pipe 21, the main selector valve 18, the first pipe 23, and the first pilot check valve 17, thereby advancing the piston rod 10a and the crosshead portion 12a integrated therewith, and thus starting a mold closing operation. In the mold closing process, molten resin is injected into the mold cavity at the predetermined timing, and a compression step is started.

Figure 2:
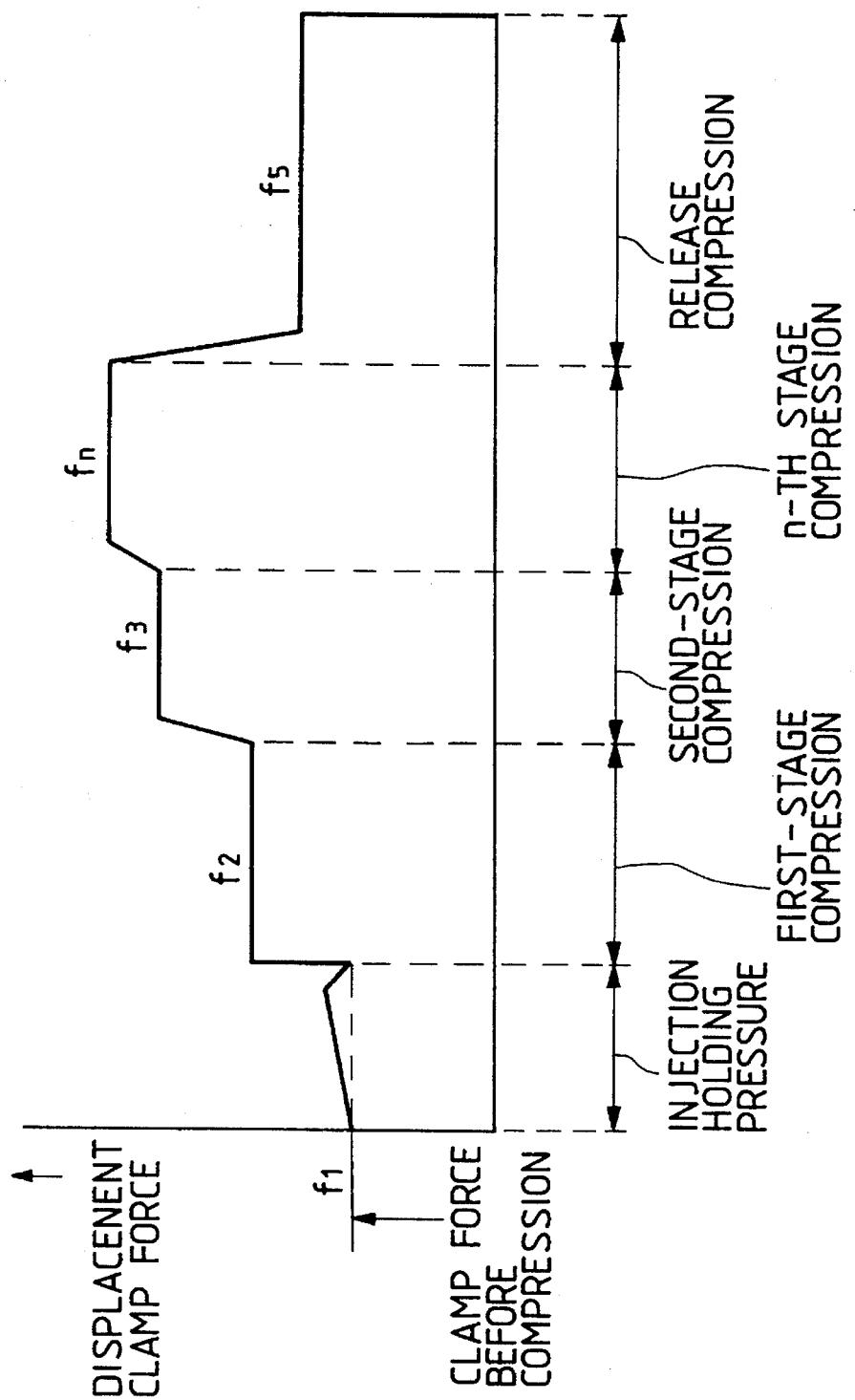
FIG. 2 is a diagram illustrating a compression step.

Next, an injection compression molding step will be described with reference to FIG. 2. The position of the crosshead 12a is detected by the position sensor 24 and input to the controller 26 as a measured position. The controller 26 compares the measured position with the preset positions. When the measured position (the position of the crosshead 12a) coincides with the stored first-stage compression position, a command signal instructing that the first and second selector valves 13 and 15 are switched to the pilot port communication position shown in the figure is issued, whereby the pilot check valves 17 and 19 respectively block the first and second pipes 23 and 25 so as to attain a state where the whole of the movable portion is stopped at the first-stage compression position.

In the compression step, the advancing force due to the pressure P of the oil confined in the clamping side oil chamber of the mold clamping cylinder 10 balances with a restoring force f of the tie bars 36, whereby the movable portion can be stopped at a substantially constant position. While sequentially repeating such operations, compression operations from the second-stage compression to the n-th-stage compression are conducted. When the n-th-stage compression is completed, the comparison operation is started in which the position measured by the position sensor 24 is compared with the stored strain relieving step position. The main selector valve 18 is then switched to the left symbolic position in the figure, the first and second selector valves 13 and 15 are switched to the energization position (the symbolic position which is opposite to that shown in FIG. 1), and the third selector valve 11 is switched to the deenergization position (the symbolic position shown in FIG. 1).

Consequently, the oil pressure is applied to the opening side oil chamber 10c of the mold clamping cylinder 10, and the oil of the clamping side oil chamber 10b of the mold clamping cylinder 10 is released into the tank 29 through the first pipe 23, the pilot check valve 17, the first branch pipe 27, the throttle valve 22, and the third selector valve 11, so that the piston rod 10a starts to retract at a low speed. When the measured position coincides with the preset position, the first selector valve 13 is switched to the deenergization position shown in FIG. 1, to make the pilot check valve 17 enter the block state, whereby the movable portion is stopped at the strain relieving step position. Then the strain relieving step is conducted on the molded piece. After the molding, the mold opening operation is conducted and the molded piece is removed from the molds 38 and 40.

In the above embodiment, the movable portion in the side of the mold clamping apparatus is stopped at plural predetermined positions in sequence during the compression step. The invention is not restricted to this arrangement. Alternatively, the movable portion may be moved continuously from the compression start position to the final compression position.

In the embodiment described above, the mold clamping apparatus is mounted in such a manner that its axis elongates horizontally. Alternatively, the mold clamping apparatus may be mounted in such a manner that its axis elongates vertically.

In the embodiment described above, the position sensor 24 for measuring the position of the crosshead 12a is used. In place of the position sensor, a sensor for measuring the stretch distance of the tie bars 36 may be disposed so that the position of the movable portion is calculated from the stretch distance of the tie bars 36.

The toggle type mold clamping apparatus of the first embodiment has properties that, even when the crosshead portion of the toggle mechanism is moved at a constant speed, the link end portion (the movable platen side) moves faster as the folding degree of the links are further advanced to attain a shortened state of the links, and the movable platen side moves slower as the extension degree of the links are further advanced to attain a state where the links are fully linearly extended. The movable platen stops at the position where the links of the toggle mechanism are fully linearly extended. In other words, the portion of the toggle mechanism in the movable platen side can be decelerated (or stopped) without decelerating the portion in the crosshead side (the mold clamping cylinder side) of the toggle mechanism.

When an injection compression molding is to be conducted with using the toggle type mold clamping apparatus, however, there arises a problem in that, as compared with a direct acting type operation, it is not easy to control the apparatus in such a manner that a predetermined compression force is exerted at a predetermined position.

It is an object of a second embodiment of the invention to solve the problem.

Second Embodiment

Figure 3:
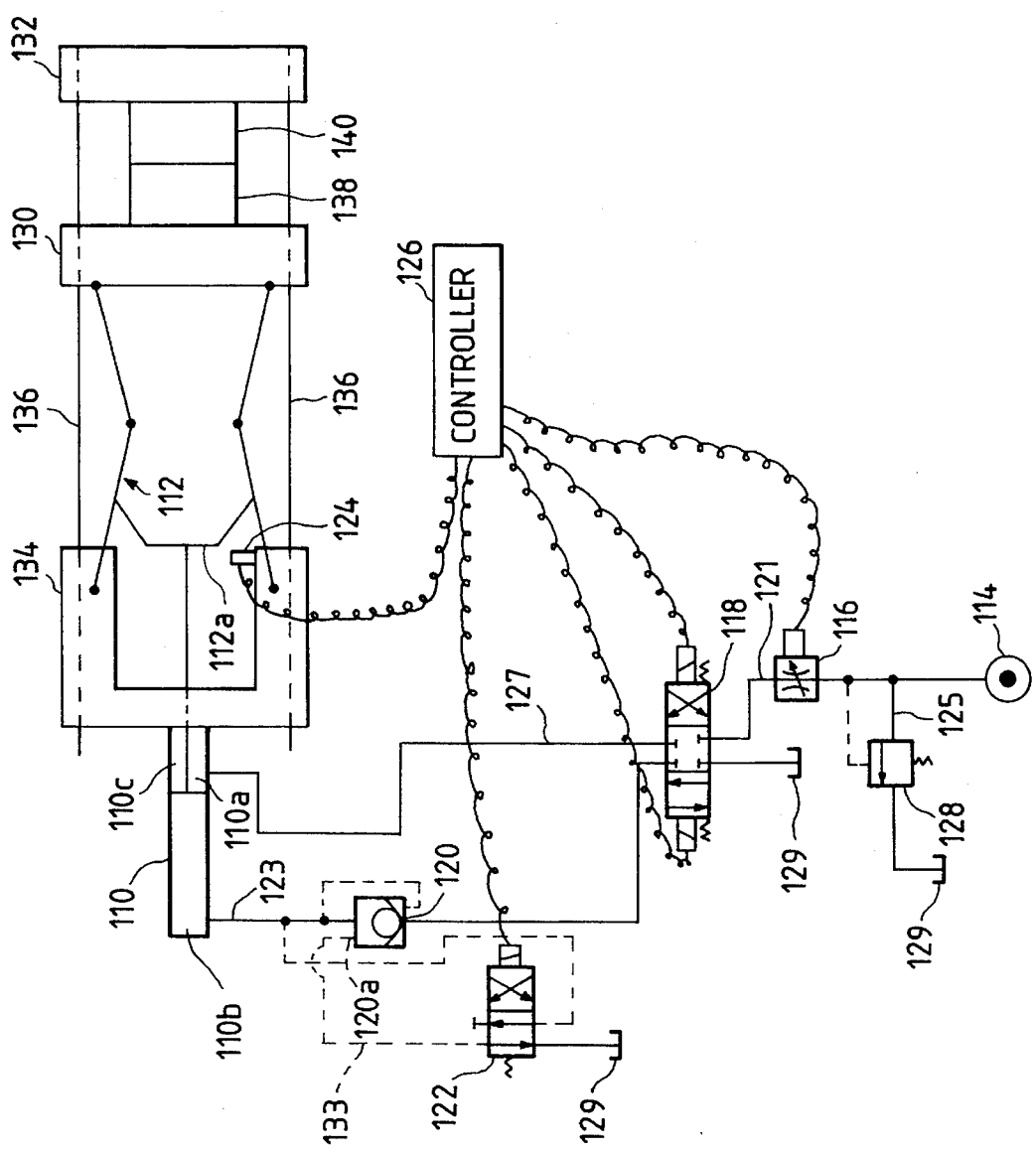
FIG. 3 is a diagram showing a toggle type injection molding apparatus which is a second embodiment of the invention.

FIG. 3 shows the second embodiment of the invention. A mold clamp housing 134 is placed at a position opposing a stationary platen 132. A movable platen 130 is disposed between the stationary platen 132 and the mold clamp housing 134. The mold clamp housing 134, and the movable platen 130 are connected to each other by a toggle mechanism 112.

Specifically, plural links of the toggle mechanism 112 are connected at their one end to the mold clamp housing 134, and at the other end to the movable platen 130. The stationary platen 132 and the mold clamp housing 134 are connected by four tie bars 136 (only two tie bars are shown in the figure) which pass through the movable platen 130.

In other words, the axial movement of the movable platen 130 is guided by the tie bars 136. A movable mold 138 is fixed to the movable platen 130, and a fixed mold 140 is fixed to the stationary platen 132. A mold clamping cylinder 110 is attached to the mold clamp housing 134. The piston rod 110a of the mold clamping cylinder 110 passes through a center portion of the mold clamp housing 134, and is connected to a crosshead portion 112a of the toggle mechanism 112. A position sensor 124 is disposed at a position opposing a crosshead 112a in the side of the mold clamp housing 134. The position sensor 124 can detect the position of the crosshead 112a. A controller 126 which receives a signal indicative of a measured position and from the position sensor 124 is disposed. The controller 126 has a timing function and can measure a period required for a movable portion to move through a predetermined stroke zone on the basis of the measured position signal from the position sensor 124.

The controller 126 can control also the selected positions of selector valves, 118 and 122 which will be described later. An oil pressure source 114 for supplying an oil pressure to the mold clamping cylinder 110 is disposed. A flow control valve 116, and the main selector valve 118 are connected to a main pipe 121 extending from the oil pressure source 114, in this sequence as viewed toward the downstream side.

In the flow control valve 116, its valve travel can be adjusted so that the flow rate supplied to the mold clamping cylinder 110 is adjusted. A branch pipe 125 is connected to the main pipe 121 at a position which is upstream to the flow control valve 116. A relief valve 128 is connected to the branch pipe 125. The return side of the relief valve 128 communicates with a tank 129. The relief valve 128 can set the upper limit pressure of the oil pressure source 114. The main selector valve 118 is a three-position selector valve.

One port (the upper left port in the figure) of the valve is connected through a first pipe 123 to a clamping side oil chamber 110b of the mold clamping cylinder 110. The first pipe 123 is provided with a pilot check valve 120 having a pilot port 120a. One end of a pilot pipe 133 is connected to the pilot port 120a of the pilot check valve 120, and the other end of the pilot pipe 133 to the first pipe 123. The pilot pipe 133 is provided with the pilot selector valve 122.

Specifically, when the pilot selector valve 122 is positioned at the position (solenoid energization position) which is opposite to that shown in the figure, the oil pressure from the clamping side oil chamber 110b of the mold clamping cylinder 110 is supplied to the pilot port 120a so that the flow from the mold clamping cylinder 110 to the main selector valve 118 is blocked.

In contrast, when the pilot selector valve 122 is positioned at the position (solenoid deenergization position) shown in the figure, the pilot port 120a communicates with the tank 129 so as to allow the oil flow from a higher pressure side to a lower pressure side (usually, the flow from the main selector valve 118 to the mold clamping cylinder 110).

Figure 4:
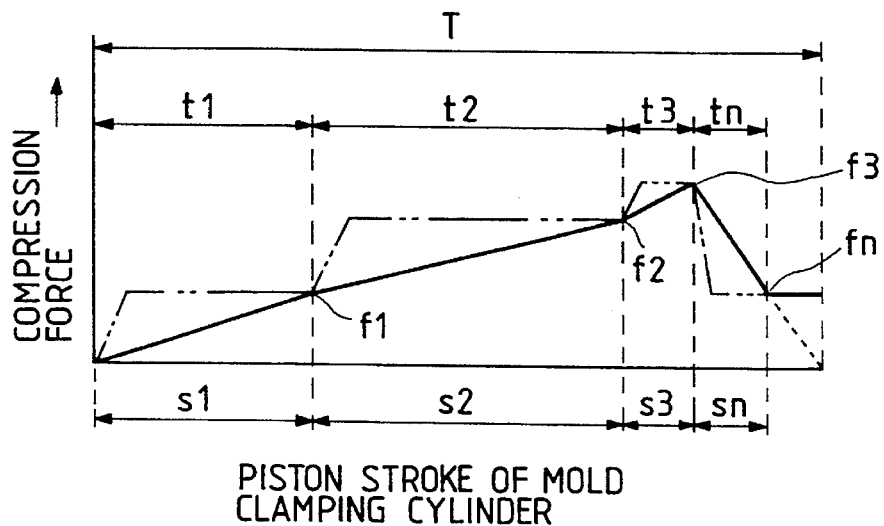
FIG. 4 is a diagram illustrating the relationship between a stroke position and a compression force in a mold clamping cylinder.

In this configuration, as shown in FIG. 4, a compression force f1 of a predetermined level is exerted on the movable platen 130 at a timing when the piston rod 110a of the mold clamping cylinder 110 is moved by a stroke s1.

Similarly, at timings when the piston rod 110a is moved by strokes s2, s3, and sn, compression forces f2, f3, and fn of corresponding levels are exerted on the movable platen 130, respectively. The phantom line in FIG. 4 indicates the relationship between the compression force and the stroke position in a direct acting type mold clamping apparatus. The other port (the upper right port in the figure) of the main selector valve 118 is connected through a second pipe 127 to the opening side oil chamber 110c of the mold clamping cylinder 110.

Next, the operation of the second embodiment will be described. In preparation, first, moving periods t1, t2, t3, and tn (the total of these periods amounts to T) for given stroke positions s1, s2, s3, and sn are stored in the controller 126 as preset periods. Furthermore, an initial valve travel of the flow control valve 116 for each of the stroke zones is calculated by the controller 126, and automatically stored therein as a preset valve travel. The relief valve 128 is set to a given preset relief pressure. In consequence, preparation to an injection compression molding is completed.

Next, one cycle of the molding is started. Under the state where the pilot selector valve 122 is set to the deenergization position (the symbolic position shown in FIG. 3), the main selector valve 118 is switched to the right symbolic position in the figure. Oil which is adjusted in flow rate by the flow control valve 116 set to the valve travel according to the initial setting is supplied from the oil pressure source 114 to the clamping side oil chamber 110b of the mold clamping cylinder 110 through the main pipe 121, the main selector valve 118, the first pipe 123, and the pilot check valve 120. This causes the piston rod 110a and the crosshead 112a integrated therewith to advance. In the mold closing process, molten resin is injected from an injection apparatus which is not shown, into the mold cavity at a predetermined timing, and a compression step is started.

In the compression step, the position sensor 124 detects the position of the crosshead 112a to measure periods required for the crosshead to move to the given positions s1, s2, s3, and sn. Each measured period is supplied to the controller 126. The controller 126 compares the measured period with the preset period, and calculates the period difference. When the period difference is small or less than a predetermined value, no correction signal is output. When the period difference is equal to or greater than the predetermined value, the stored value of the valve travel of the relevant zone is corrected by the valve travel correcting amount corresponding to the period difference. In the next cycle, therefore, a flow rate corresponding to the corrected valve travel is supplied to the clamping side oil chamber 110b of the mold clamping cylinder 110, so that the period during which the crosshead 112a moves to the predetermined stroke position is made coincident with the preset period. That is, a compression force coincident with the preset value is exerted on the movable platen 130 at the predetermined stroke position.

Third Embodiment

Figure 5:
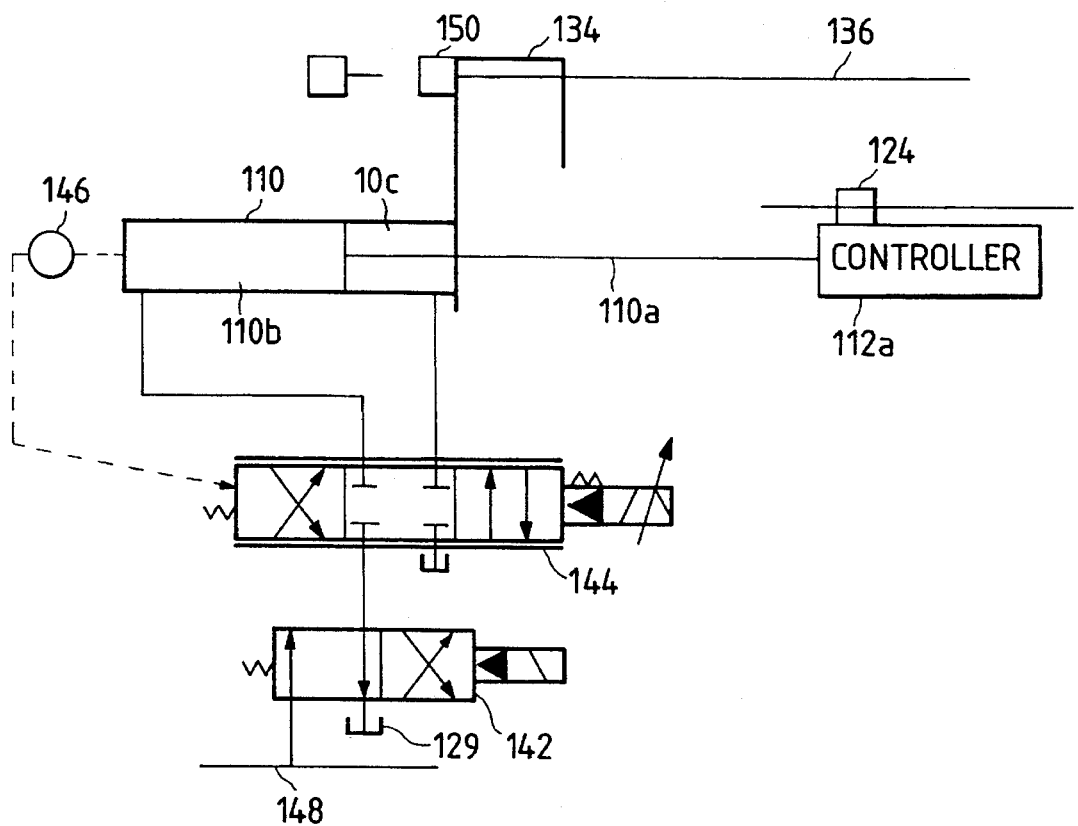
FIG. 5 is a diagram showing another apparatus which is a third embodiment of the invention.

FIG. 5 shows a third embodiment of the invention. In the third embodiment, in place of the hydraulic circuit shown in FIG. 3, a selector valve 142, and a servo valve 144 are disposed between a main circuit 148 including an oil pressure source and oil chambers 110b and 110c of a mold clamping cylinder 110, and a pressure head 146 which can sense the pressure of the clamping side oil chamber 110b is disposed. A signal from the pressure head 146 is supplied to the servo valve 144. A tie bar stretch detector 150 which can measure the extension distance of a tie bar 136 is disposed at the fixing portion in the side of a mold clamp housing 134. A signal from the tie bar stretch detector 150 is supplied to a controller which is not shown.

The third embodiment operates in the same manner as the second embodiment except several points such as that the selector valve 142 is switched so as to supply an oil pressure from the main circuit 148 to either of the clamping side oil chamber 110b and opening side oil chamber 110c of the mold clamping cylinder 110, that the flow rate is controlled by the servo valve 144 in accordance with the signal from the pressure head 146, and that, on the basis of the signal from the tie bar stretch detector 150, the controller (not shown) judges whether a compression force of a predetermined level is exerted at a predetermined stroke position, and outputs a control signal to the servo valve 144 to conduct a feedback control so as to exert a given compression force.

In the second embodiment described above, after the valve travel of the flow control valve 116 is automatically set, the period for each of the stroke zones is measured, and the valve travel of the flow control valve 116 is corrected on the basis of the difference between the measured period and the preset period. When it is judged that the conditions such as an oil temperature are so stable that the automatic setting of the valve travel is sufficient for adjustments and the correction is not required, the subsequent adjustments may be omitted. In contrast, in the case where the conditions such as oil temperature are easily changed, the adjustment of the valve travel of the flow control valve 116 may be conducted at every given number of molding cycles.

In the embodiments described above, the position sensor 124 detects the position of the crosshead 112a of the toggle mechanism 112. Alternatively, the sensor may detect of the position of another moving portion such as the piston rod 110a of the mold clamping cylinder 110.

The toggle type mold clamping apparatus of the first embodiment has properties that, even when the crosshead portion of the toggle mechanism is moved at a constant speed, the link end portion (the movable platen side) moves faster as the folding degree of the links are further advanced to attain a shortened state of the links, and the movable platen side moves slower as the extention degree of the links are further advanced to attain a stretched state where the links are fully linearly stretched. The movable platen stops at the position where the links of the toggle mechanism are fully linearly extended. In other words, the portion of the toggle mechanism in the movable platen side can be decelerated (or stopped) without decelerating the portion in the crosshead side (the mold clamping cylinder side). At the position where the links of the toggle mechanism are fully linearly extended, a final pressing force (mold clamping force) according to the force magnification of the toggle mechanism exerts is generated.

However, the toggle type mold clamping apparatus of the first embodiment has a problem as follows. When the links of the toggle mechanism are fully linearly extended (the state where the tie bars are extended), the dimension between the stationary and movable platens may be increased (or the tie bars are further extended) because of, for example, the temperature of the molds is raised during the use. In such a case, a mold clamping force greater than a preset level is exerted on the molds, thereby producing a problem in that the mold clamping apparatus and the molds are damaged.

It is an object of a fourth embodiment of the invention to solve the problem.

Fourth Embodiment

Figure 6:
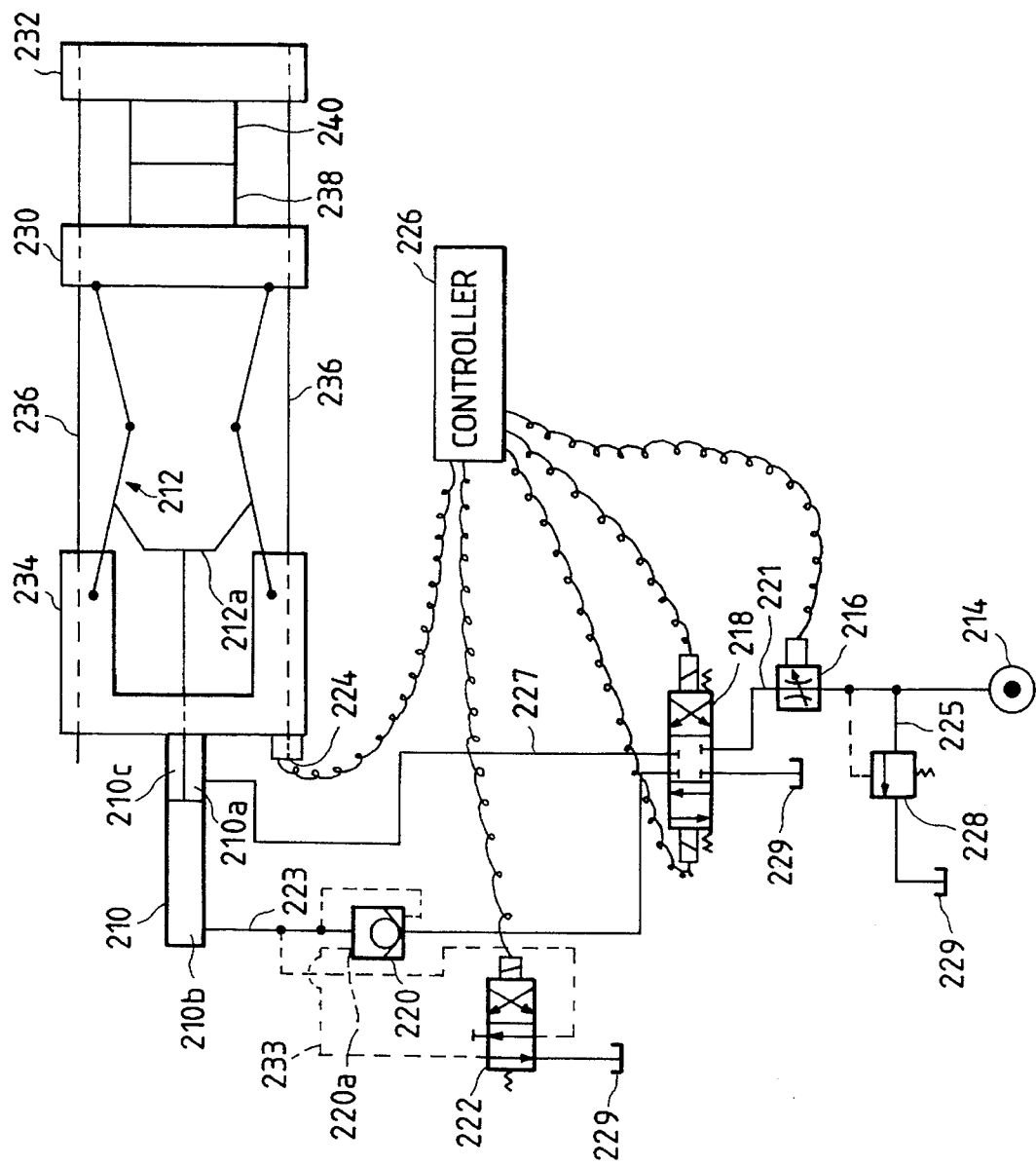
FIG. 6 is a diagram showing a fourth embodiment of the invention.

FIG. 6 shows the fourth embodiment of the invention. A mold clamp housing 234 is placed at a position opposing a stationary platen 232. A movable platen 230 is disposed between the stationary platen 232 and the mold clamp housing 234. The mold clamp housing 234 and the movable platen 230 are connected to each other by a toggle mechanism 212. Specifically, plural links of the toggle mechanism 212 are connected at their one end to the mold clamp housing 234, and at the other end to the movable platen 230. The stationary platen 232 and the mold clamp housing 234 are connected by four tie bars 236 (only two tie bars are shown in the figure) which pass through the movable platen 230. In other words, the axial movement of the movable platen 230 is guided by the tie bars 236. A movable mold 238 is fixed to the movable platen 230, and a fixed mold 240 is fixed to the stationary platen 232. A mold clamping cylinder 210 is attached to the mold clamp housing 234. The piston rod 210a of the mold clamping cylinder 210 passes through a center portion of the mold clamp housing 234, and is connected to a crosshead portion 212a of the toggle mechanism 212.

A tie bar stretch detector 224 is disposed at a fixing portion opposing a projecting end of a crosshead 212a in the mold clamp housing 234 side. The tie bar stretch detector 224 can detect a distance by which the tie bars 236 are extended from a reference position. A controller 226 which receives a signal indicative of a measured distance from the tie bar stretch detector 224 is disposed.

The controller 226 can control the select positions of selector valves 218 and 222 which will be described later. An oil pressure source 214 for supplying an oil pressure is disposed. An oil pressure source 214 for supplying an oil pressure to the mold clamping cylinder 210 is disposed. A flow control valve 216, and the main selector valve 218 are connected to a main pipe 221 elongating from the oil pressure source 214, in this sequence as viewed toward the downstream side. A branch pipe 225 is connected to the main pipe 221 at a position which is upstream to the flow control valve 216. A relief valve 228 is connected to the branch pipe 225. The return side of the relief valve 228 communicates with a tank 229. The relief valve 228 can set the upper limit pressure of the oil pressure source 214. The main selector valve 218 is a three-position selector valve.

One port (the upper left port in the figure) of the valve is connected through a first pipe 223 to a clamping side oil chamber 210b of the mold clamping cylinder 210. The first pipe 223 is provided with a pilot check valve 220 having a pilot port 220a. One end of a pilot pipe 233 is connected to the pilot port 220a of the pilot check valve 220, and the other end of the pilot pipe 233 to the first pipe 223. The pilot pipe 233 is provided with the pilot selector valve 222. Specifically, when the pilot selector valve 222 is positioned at the symbolic position (solenoid energization position) which is opposite to that shown in the figure, the oil pressure from the clamping side oil chamber 210b of the mold clamping cylinder 210 is supplied to the pilot port 220a so that the flow from the mold clamping cylinder 210 to the main selector valve 218 is blocked. In contrast, when the pilot selector valve 222 is positioned at the position (solenoid deenergization position) shown in the figure, the pilot port 220a communicates with the tank 229 so as to allow the oil flow from a higher pressure side to a lower pressure side (usually, the flow from the main selector valve 218 to the mold clamping cylinder 210). In this configuration, the operation of the toggle mechanism 212 can be limited so that the tie bars 236 are prevented from being extended by a distance greater than the preset value (or that an overload is not produced). The other port (the upper right port in the figure) of the main selector valve 218 is connected through a second pipe 227 to the opening side oil chamber 210c of the mold clamping cylinder 210.

Next, the operation of the fourth embodiment will be described. In preparation, first, the preset extension distance of the tie bars 236 is input to the controller 226 as preset data. The valve travel of the flow control valve 216 is adjusted, and the relief valve 228 is set to a given preset relief pressure. In consequence, preparation to an injection compression molding is completed.

Under the state where the pilot selector valve 222 is set to the deenergization position (the symbolic position shown in FIG. 6), the main selector valve 218 is switched to the right position in the figure. Oil which is adjusted in flow rate by the flow control valve 216 is supplied from the oil pressure source 214 to the clamping side oil chamber 210b of the mold clamping cylinder 210 through the main pipe 221, the main selector valve 218, the first pipe 223, and the pilot check valve 220. This causes the piston rod 210a and the crosshead 212a integrated therewith to advance, or the mold closing operation to be started.

In the mold closing process, molten resin is injected from an injection apparatus which is not shown, into the mold cavity at a predetermined timing, and a compression step is started.

The extention distance of the tie bars 236 is detected by the tie bar stretch detector 224, and then input to the controller 226 as a measured extention distance. The controller 226 compares the measured extention distance with the preset extention distance. When the two extention distances do not coincide with each other, no signal is output to the pilot selector valve 222 so that the mold clamping is conducted in accordance with a normal molding process and a compression molded piece is formed. If the temperature of the molds 238 and 240 is raised for some reason during the molding process, the dimensions of the molds 238 and 240, etc. in the mold opening and closing axial direction are increased.

In such a case, when the toggle mechanism 212 is extended in accordance with the preset conditions to advance the crosshead 212a to the predetermined position, an excess mold clamping force is exerted on the molds 238 and 240 (or the tie bars 236 are extended by a distance greater than the preset distance).

According to the invention, the extention distance of the tie bars 236 is detected by the tie bar extention detector 224, and a command signal is output from the controller 226 when the measured distance coincides with the preset distance, so that the main selector valve 218 is switched to the neutral position shown in the figure and the pilot selector valve 222 to the energization position. Consequently, the oil pressure from the oil pressure source 214 is not supplied to the mold clamping cylinder 210, and the pressure of the clamping side oil chamber 210b of the mold clamping cylinder 210 is supplied to the pilot port 220a of the pilot check valve 220, whereby the flow from the clamping side oil chamber 210b of the mold clamping cylinder 210 to the main selector valve 218 is blocked. In other words, the state where the toggle mechanism 212 does not extend the tie bars 236 by a distance greater than the preset distance is maintained so that a compression force of a predetermined level is exerted on the molds 238 and 240. Since the variation in dimension due to the temperature change of the molds in one shot is very small, in the invention, the influence of the expansion in one shot is neglected.

Fifth Embodiment

Figure 7:
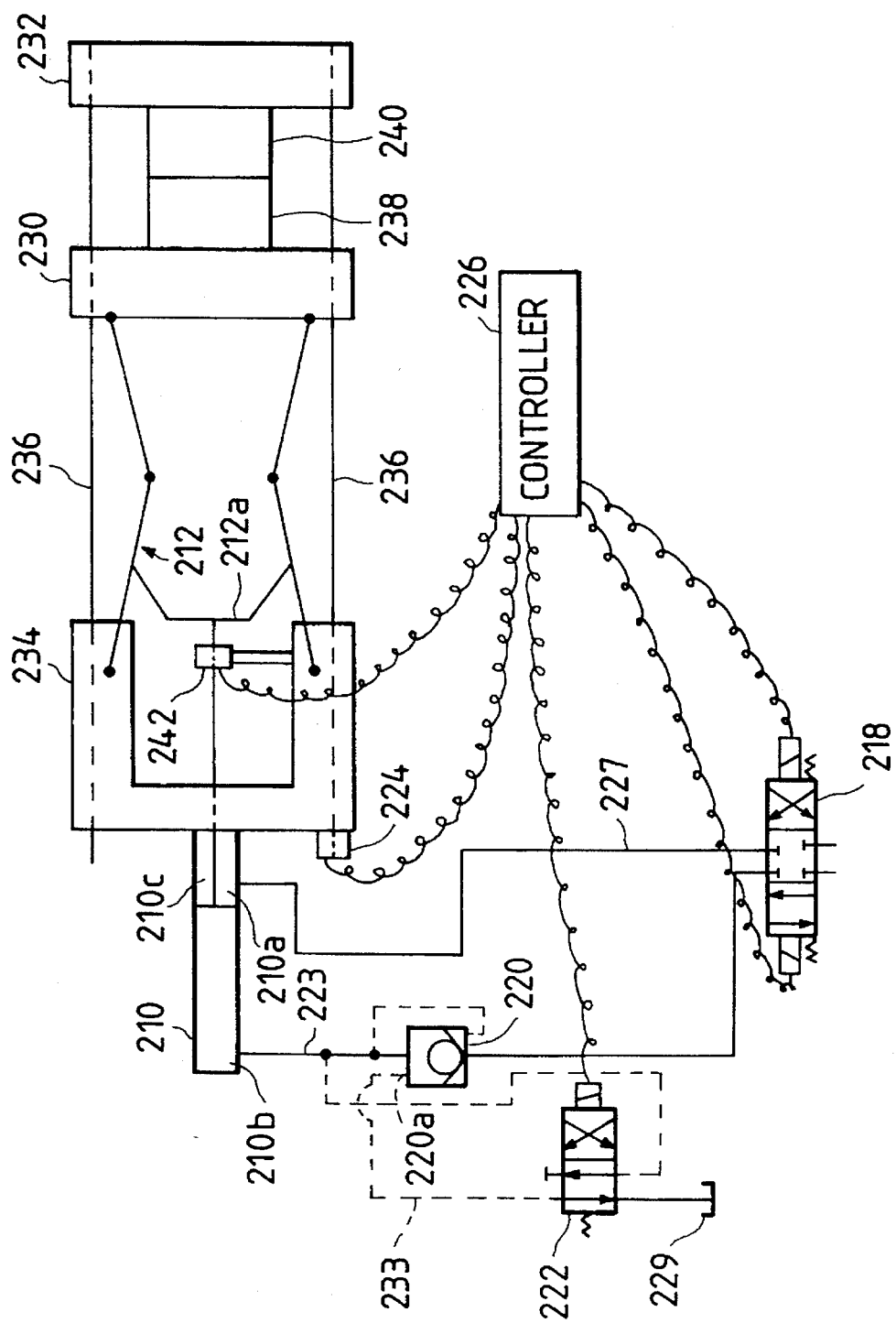
FIG. 7 is a partial diagram showing a fifth embodiment of the invention.

FIG. 7 shows main portions of a fifth embodiment of the invention. The fifth embodiment is different from the fourth embodiment in that a position detector 242 which can measure the position of the piston rod 210a of the mold clamping cylinder 210 is disposed in the mold clamp housing 234. A signal indicative of a measured position and from the position detector 242 is input to the controller 226. Plural predetermined stroke positions (preset positions) of the piston rod 210a of the mold clamping cylinder 210 are previously stored in the controller 226. The controller 226 compares the measured position with the preset position. When the positions coincide with each other, the pilot selector valve 222 is switched to the communication position for a preset period. The other structures are the same as those of the fourth embodiment.

The fifth embodiment operates in the following manner. When, on the basis of the signal from the position detector 242, the controller 226 judges that the piston rod 210a of the mold clamping cylinder 210 is positioned at the given preset position, the main selector valve 218 is switched to the neutral position and the pilot selector valve 222 to the communication position. Accordingly, the oil pressure of the clamping side oil chamber 210b of the mold clamping cylinder 210 is supplied to the pilot port 220a of the pilot check valve 220, so that the flow from the mold clamping cylinder 210 to the main selector valve 218 is blocked, whereby the movable mold 238 is stopped at the given position. After the elapse of predetermined time, the main selector valve 218 is switched to the right position in the figure and the pilot selector valve 222 to the shut-off position so that the movable mold 238 is moved. Similarly, the operations of stopping and moving the movable mold 238 are conducted at each of the preset stroke positions. In this way, a multistage compression operation is conducted. The other operations are the same as those of the fourth embodiment.

In the embodiments described above, it is considered that, under the state where the valve is at the neutral position, the internal leakage of the main selector valve 218 presents no problem. In the case where the internal leakage of the main selector valve 218 must be considered, also the second pipe 227 may be provided with a hydraulic circuit having pilot check valves and pilot selector valves which are similar to those of the hydraulic circuit of the first pipe 223.

In the fifth embodiment described above, the position sensor 224 detects the position of the piston rod 210a of the mold clamping cylinder 210. Alternatively, the sensor may detect the position of another moving portion such as the crosshead 212a of the toggle mechanism 212.

In the above, the embodiments in which the invention is applied to an injection compression molding have been described. The invention may be applied also to a molding other than an injection compression molding.

As described above, according to the invention, a toggle type mold clamping apparatus can perform an injection compression molding in which a compression step is conducted while stopping a mold at each of plural desired positions and a strain relieving step is conducted while slightly retracting the mold. Therefore, even in an injection compression molding, operation, it is not required to precisely measure the position of a mold and control a flow rate supplied to a mold clamping cylinder.

As described above, according to the invention, even when a toggle type mold clamping apparatus is used, a compression force conforming to a preset value can be exerted on molds at each of preset positions, thereby allowing an injection compression molding operation to be conducted in a preset manner.

As seen from the above, according to the invention, a toggle type mold clamping apparatus is prevented from exerting a mold clamping force greater than a desired level on a mold, and therefore problems such as damages of the mold are prevented from occurring. Even in an injection compression molding operation, furthermore, it is not required to precise control a flow rate supplied to a mold clamping cylinder.

What is claimed is:

1. An injection compression molding method comprising:

closing a mold in a closing direction by a crosshead of a toggle mechanism;

injecting molten resin of a predetermined amount into a mold cavity during or after a mold closing process;

compressing the molten resin by causing the crosshead to advance in a first direction to a previously decided stroke position to form a molded piece;

relieving strain of the molded piece caused by pressure of the resin in the mold cavity by moving the crosshead in a second direction, which is opposite the first direction, to a predetermined retracted position from a final stroke position; and removing a molded piece by opening the mold to remove the molded piece;

wherein said compressing step comprises:

setting and storing a previously decided moving distance for each of stroke zones through which a movable portion of a mold clamping cylinder moves and a period required for the movable portion to move through the stroke zone, the mold clamping cylinder being coupled to the mold;

measuring a moving period of the movable portion for each of the stroke zones in a molding cycle, comparing the moving period of the movable portion with the corresponding preset period to obtain a difference between the periods for each stroke zone; and adjusting the flow rate of fluid supplied to the mold clamping cylinder so as to set the difference in period for each stroke zone to zero in the next molding cycle.

2. An injection compression molding method as claimed in claim 1, wherein the adjusting step is conducted every predetermined number of molding cycles.

* * * * *